(12) United States Patent
Sheldon-Coulson et al.

(10) Patent No.: US 11,649,800 B2
(45) Date of Patent: May 16, 2023

(54) RENEWABLE ENERGY DEVICE WITH LATERAL APERTURE WAVE-DRIVEN PROPULSION

(71) Applicant: Lone Gull Holdings, Ltd., Portland, OR (US)

(72) Inventors: Garth Alexander Sheldon-Coulson, Portland, OR (US); Brian Lee Moffat, Portland, OR (US); Ivar Lee Thorson, Portland, OR (US)

(73) Assignee: Lone Gull Holdings, Ltd., Portland, OR (US)

( * ) Notice: Subject to any disclaimer, the term of this patent is extended or adjusted under 35 U.S.C. 154(b) by 0 days.

(21) Appl. No.: 17/556,815

(22) Filed: Dec. 20, 2021

(65) Prior Publication Data

US 2022/0213862 A1 Jul. 7, 2022

Related U.S. Application Data

(60) Provisional application No. 63/133,286, filed on Jan. 1, 2021.

(51) Int. Cl.
*F03B 13/14* (2006.01)
*B63H 11/02* (2006.01)

(52) U.S. Cl.
CPC ............ *F03B 13/148* (2013.01); *B63H 11/02* (2013.01)

(58) Field of Classification Search
CPC ........ F03B 13/148; B63H 11/02; B63H 11/09
USPC .......................................................... 60/501
See application file for complete search history.

(56) References Cited

U.S. PATENT DOCUMENTS

| | | | |
|---|---|---|---|
| 2010/0126047 A1* | 5/2010 | Drabble | E02F 3/8841 37/324 |
| 2017/0275849 A1* | 9/2017 | Koevoets | E02F 3/9243 |
| 2018/0355582 A1* | 12/2018 | Beij | B01D 21/2444 |
| 2019/0353139 A1* | 11/2019 | Sheldon-Coulson | ... F03B 13/24 |
| 2020/0056578 A1* | 2/2020 | Sheldon-Coulson | F03B 13/142 |
| 2020/0182218 A1* | 6/2020 | Sheldon-Coulson | H02K 44/085 |
| 2021/0372363 A1* | 12/2021 | Sheldon-Coulson | F03B 13/142 |
| 2022/0170440 A1* | 6/2022 | Sheldon-Coulson | F03B 13/142 |

* cited by examiner

*Primary Examiner* — Mickey H France
(74) *Attorney, Agent, or Firm* — Fulwider Patton LLP

(57) ABSTRACT

Disclosed is an apparatus that floats at the surface of a body of water over that waves pass. Passing waves, and/or the motions they impart to the apparatus as they pass, result in a net and/or effective propulsion of the apparatus in at least a first direction relative to the geometry and/or structure of the apparatus, and typically, at least in part, toward a direction from that waves approach the apparatus.

16 Claims, 8 Drawing Sheets

US 11,649,800 B2

RENEWABLE ENERGY DEVICE WITH LATERAL APERTURE WAVE-DRIVEN PROPULSION

CROSS-REFERENCES TO RELATED APPLICATIONS

This application claims priority to U.S. Provisional Patent Application No. 63/133,286, filed Jan. 1, 2021, the content of that is incorporated by reference herein in its entirety.

BACKGROUND

There are many applications that require the utilization and/or operation of an apparatus that nominally floats adjacent to an upper surface of a body of water over which waves tend to pass. Many of these devices are be equipped with a propulsion system that generates propulsion through its consumption of converted or stored energy resources (e.g. batteries, hydrogen gas, and diesel fuel). The missions that these devices complete before exhausting their onboard stored energy resources are typically of a relatively sort duration. However, there are consequences and/or risks to these devices should they exhaust their energy, and their energy-consuming ability to propel themselves.

The prior art contains disclosures of mechanisms, e.g. those involving moving flaps and rotatable rigid sails, that are able to harness ambient environmental fluid movements such as waves and wind, and thereby enable vessels to generate propulsive forces sufficient to propel those vessels. However, such mechanisms are or contain moving parts, and moving parts constitute potential points of failure. Devices that use such moving-part mechanisms to propel themselves, especially those that operate far from land, tend to be at risk of failure at least in part because of the risk that the moving parts on which they depend for propulsion will wear out, be damaged, and/or otherwise fail.

There is a need for a mechanism, method, technology, apparatus, and/or vessel, that is able to achieve propulsion in a passive manner, i.e. without the use of moving parts, via their structural manipulation, control, guidance, channeling, and/or interaction with ambient waves.

SUMMARY OF THE INVENTION

The present invention is a device that interacts with waves so as to produce a thrusting force without the benefit of any moving parts and without the consumption of any stored energy. An embodiment of the present disclosure orients the apparatus, and the thrust produced by its respective wave-thrusting mechanism, through its use of thrusters that, when energized, rotate the apparatus so as to direct a wave-driven thrust toward a desirable azimuthal direction, and/or in a desirable direction relative to a local wave-propagation direction.

DETAILED DESCRIPTION OF THE PREFERRED EMBODIMENTS

Figure 1:
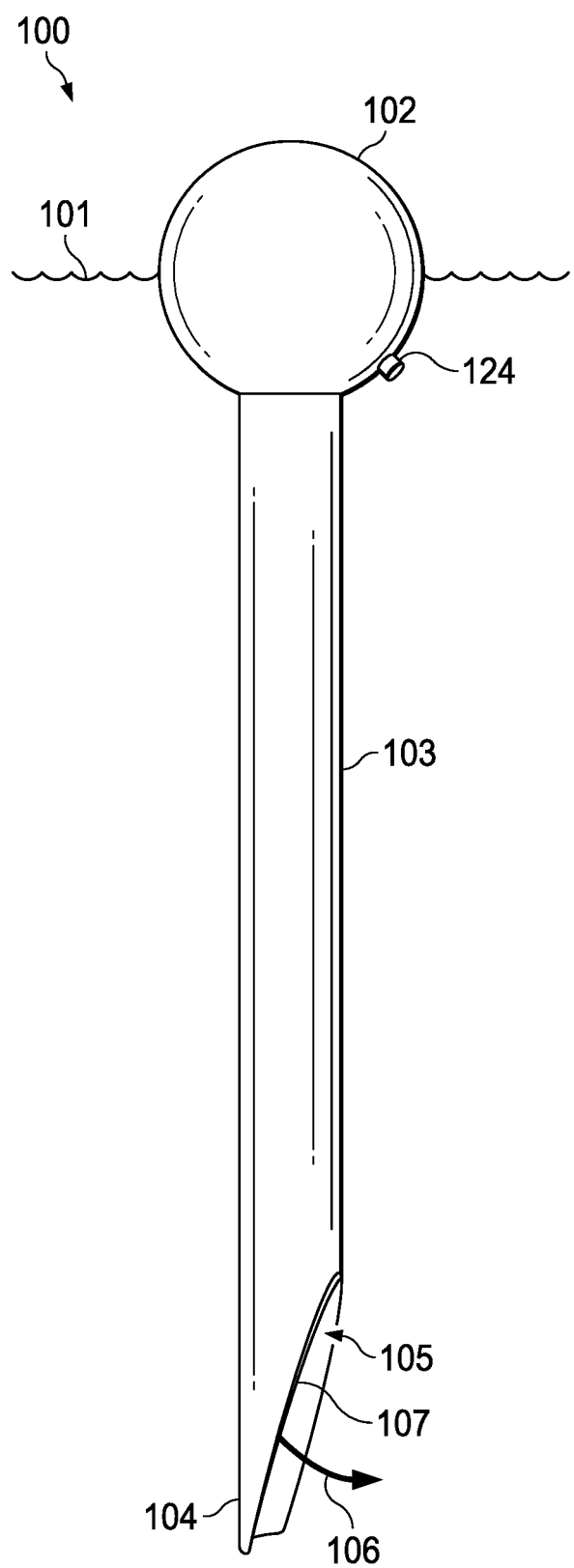
FIG. 1 is a perspective side view of a first embodiment of the present invention.

FIG. 1 shows a side view of an embodiment 100 of the present disclosure. The embodiment 100 is similar in many respects of structure and operation to the device disclosed in U.S. Pat. No. 10,605,226 (Inertial Hydrodynamic Pump and Wave Engine, issued on Mar. 31, 2020 to Garth Sheldon-Coulson et. al.), the content of which is fully incorporated herein by reference. Details of the operation of that device will be largely omitted herein for brevity. The embodiment 100 illustrated in FIG. 1 incorporates a new structural feature in the form of an oblique lowermost opening 105 at a distal end 104 of its inertial reaction tube 103 that produces lateral thrust and propulsion in response to the movement of ocean water flowing into and out from that inertial reaction tube 103.

The embodiment 100 is configured to float adjacent to an upper surface 101 of a body of water over which waves pass. The illustrated embodiment is a free-floating wave-energy-conversion device comprising, at least in part, a hollow and buoyant uppermost approximately spherical buoy 102, from which depends a hollow inertial water tube 103. The hollow inertial water tube includes an aperture 105 and/or mouth, the edge 107 of which is primarily defined within a plane that is oblique, slanted, and/or not normal to, a nominally vertical longitudinal axis of the floating device.

When the device 100 is moved in response to the passage of waves at and/or across the surface 101 of the body of water on which it floats, water 106 tends to move into, and out from the hollow interior of the device's inertial water tube 103. When water 106 within the inertial water tube is pressurized relative to the water outside the inertial water tube, then water within the inertial water tube tends to flow out of the lowermost aperture 105. However, because the aperture 105 is angled with respect to, and not within a plane normal to, a vertical longitudinal axis of the inertial water tube 103, water 106 flowing out of the inertial water tube 103 tends to escape at an angular orientation approximately normal to the plane defined by the edge 107 of the aperture 105, rather than exiting at a primarily vertical and/or downward direction.

Because pressurized water 106 flowing out of the inertial water tube 103 tends to do so in a direction characterized at least in part by a lateral and/or horizontal velocity component, the lowermost portion 104 of the inertial water tube 103, i.e. that portion of the inertial water tube opposite the lowermost aperture 105 tends to be pushed by the pressurized water flowing out of the inertial water tube. This hydrodynamic pressure against the inner surface of the lowermost portion 104 of the inertial water tube 103 is not offset and/or compensated for, by an equal and opposite pressure and/or force against an opposite side of the inertial water tube—where the tube wall is absent, and there is instead an angular aperture.

For the same reason that a rocket engine propels a rocket by allowing a pressurized fluid to push against one end of a combustion chamber while allowing that pressurized fluid to escape through the opposite end of that combustion chamber, so too does the slanted lowermost aperture 105 of the inertial water tube 103 illustrated in FIG. 1 tend to propel the device 100 in response to an outflow 106 of pressurized fluid through that lowermost aperture.

In response to wave action at the device 100, and as a consequence of the resultant movement of water up and down within the device's inertial water tube 103, water moving upwards within the inertial water tube is occasionally and/or periodically ejected from an upper mouth and/or aperture and is thereafter trapped within a reservoir contained within a hollow interior and/or chamber within the device's buoy 102. A pocket of air above and in fluid communication with the reservoir is pressurized and increases the pressure of water within the reservoir. Pressurized water thus trapped within the reservoir tends to flow out of the device through a water turbine and generator positioned within an effluent tube 124.

Figure 2:
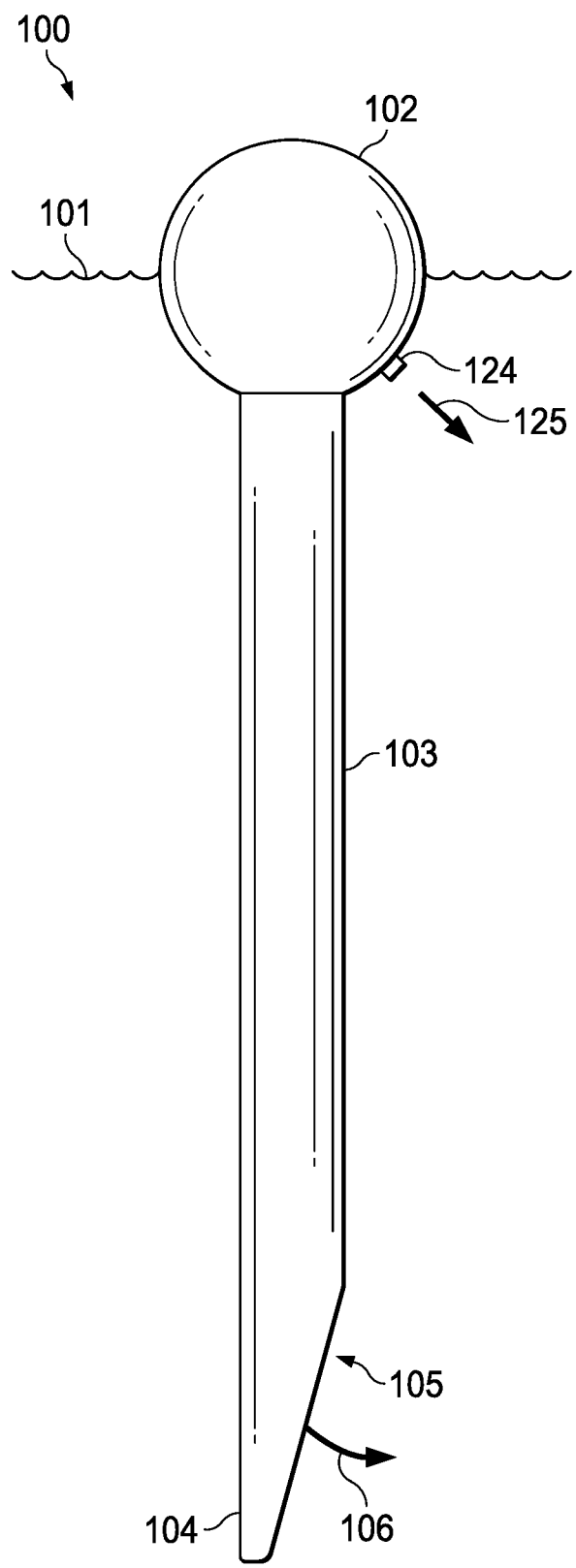
FIG. 2 is a side view of the first embodiment of the present invention.
Figure 3:
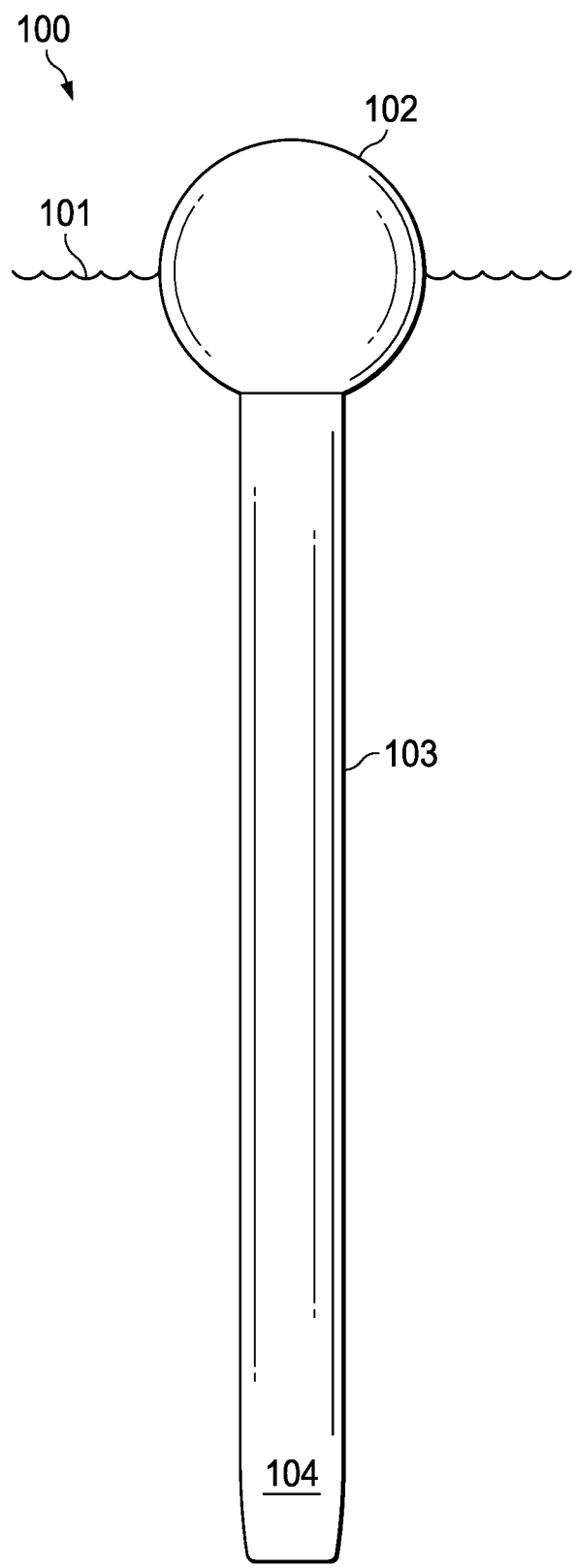
FIG. 3 is a front view of the first embodiment of the present invention.
Figure 4:
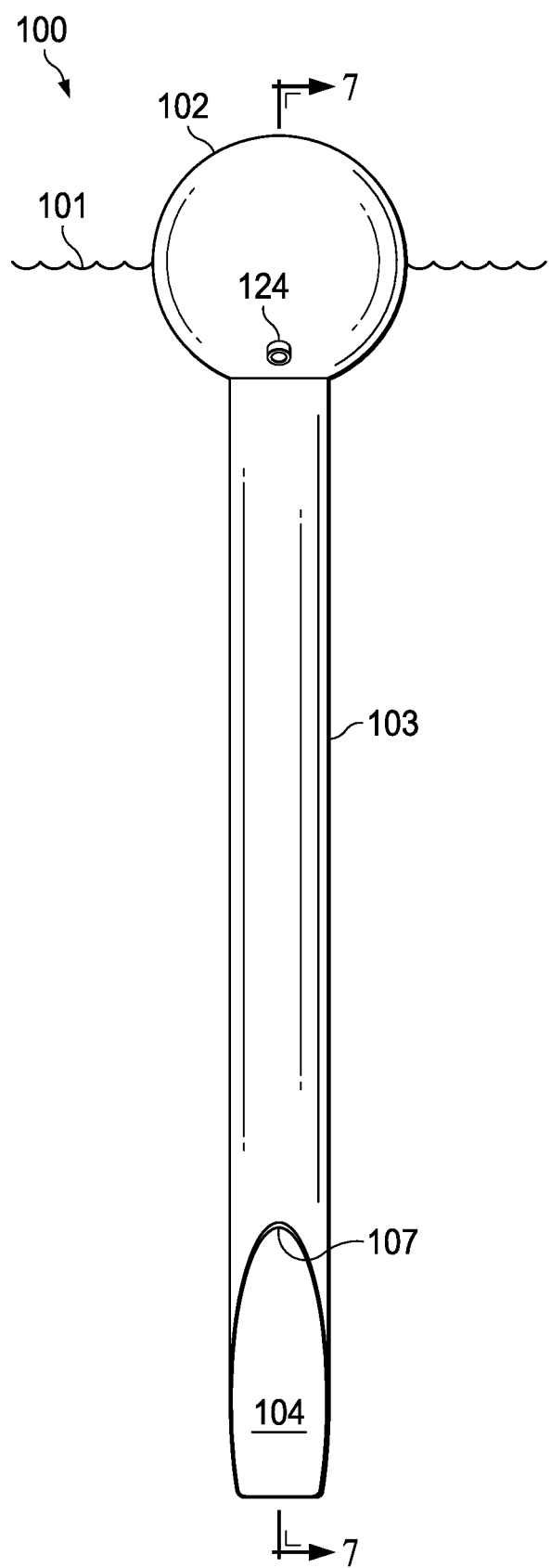
FIG. 4 is a back view of the first embodiment of the present invention.
Figure 5:
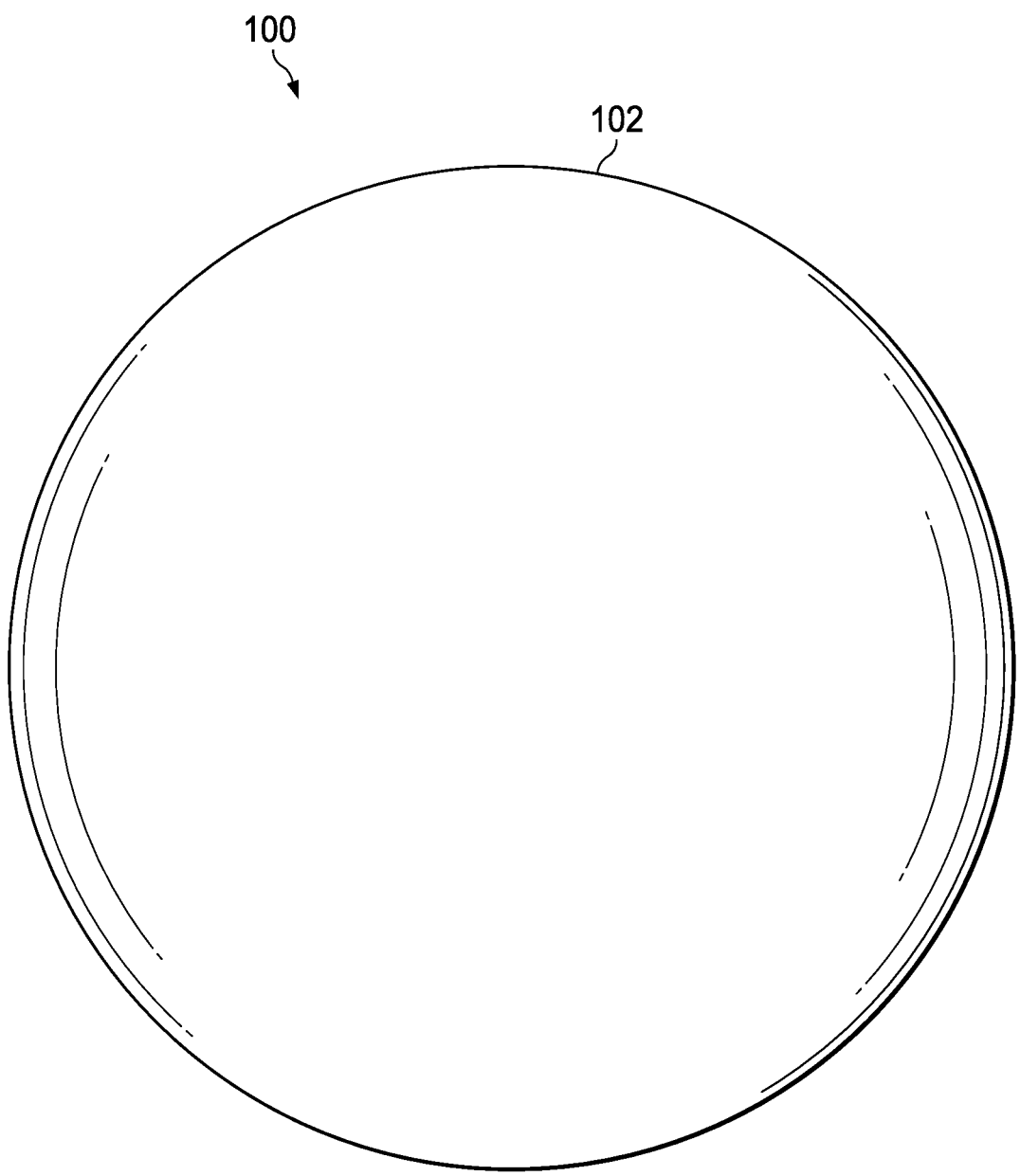
FIG. 5 is a top view of the first embodiment of the present invention.
Figure 6:
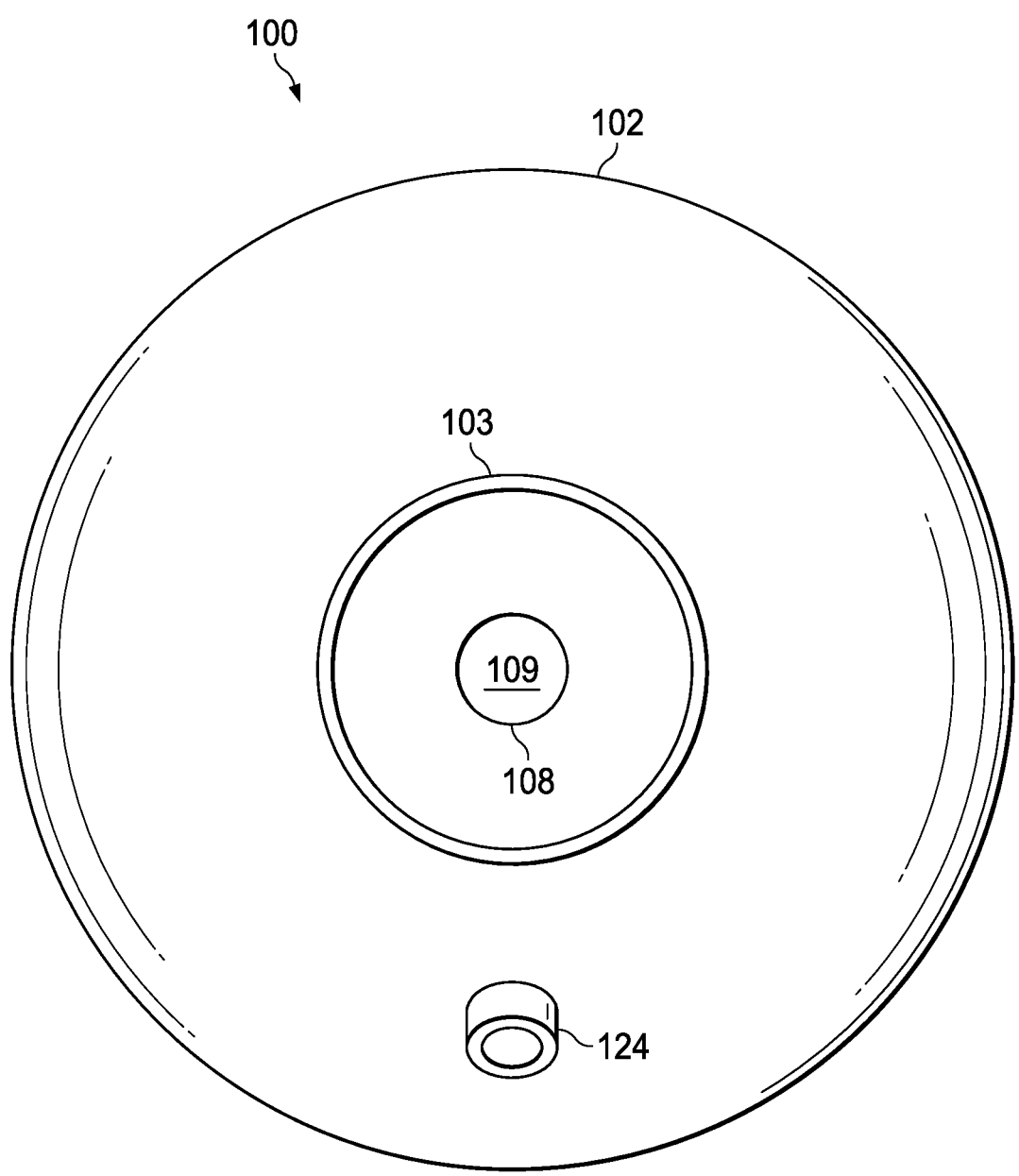
FIG. 6 is a bottom view of the first embodiment of the present invention.

FIG. 2 shows a side view of the same embodiment illustrated in FIG. 1. When pressurized water 125 flows out of the device 100 through effluent pipe 124, it causes a water turbine therein to rotate that imparts energy to a generator operably connected to the water turbine, thereby causing the generator to produce electrical power. FIG. 3 shows a front view of the same embodiment illustrated in FIGS. 1 and 2, and FIG. 4 shows a back side view. FIG. 5 shows a top view and FIG. 6 shows a bottom view of the same embodiment illustrated in FIGS. 1-5.

An upper portion of the fluid channel within the inertial water tube 103 is preferably constricted, and an upper aperture 109 of the inertial water tube is characterized by a cross-sectional area that is smaller than the area of a horizontal cross-section of a lower portion of the inertial water tube 103. The upper aperture of the fluid channel within the inertial water tube is positioned within the hollow buoy 102, and water ejected from that upper aperture is deposited into, and trapped within, a water reservoir within the hollow buoy's interior. The edge 108 that defines the upper aperture of the fluid channel within the embodiment's inertial water tube, unlike the edge 107 that defines the fluid channel's lower aperture 105, is approximately normal to a vertical longitudinal axis of the embodiment and of the fluid channel within the embodiment's inertial water tube.

Figure 7:
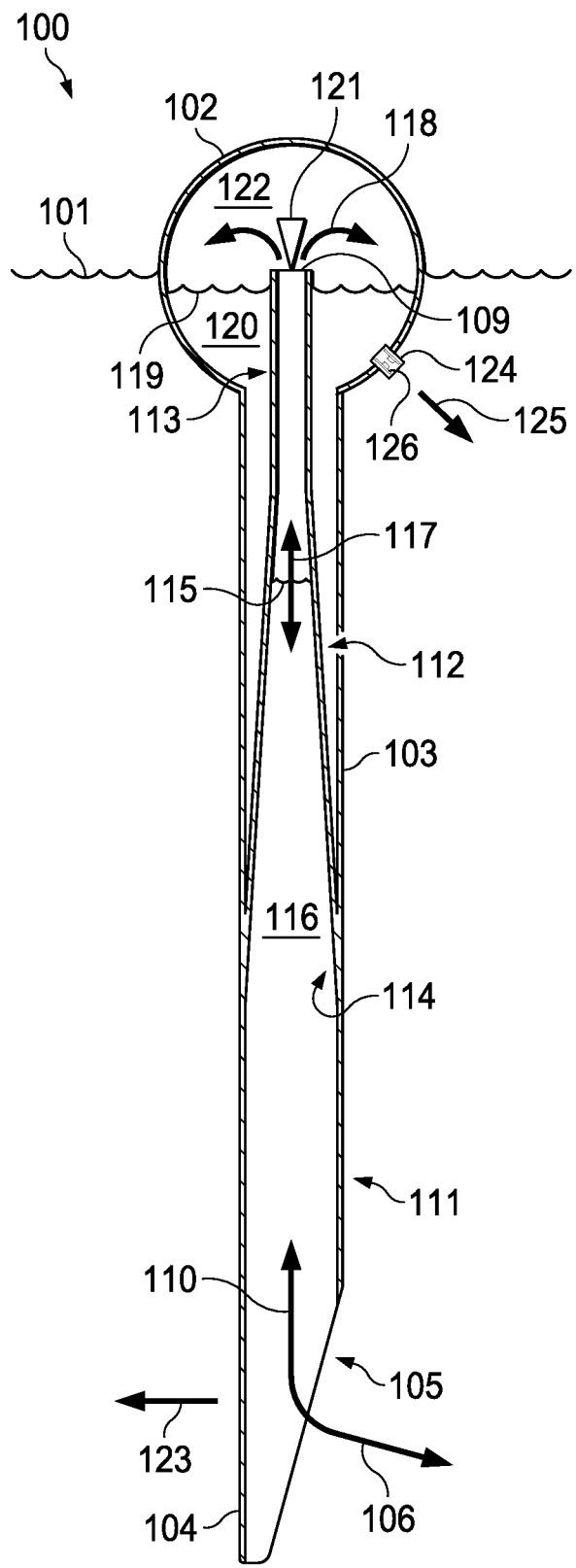
FIG. 7 is cross sectional side view of the first embodiment of the present invention.

FIG. 7 shows a cross sectional view of the same embodiment of the present disclosure that is illustrated in FIGS. 1-6, wherein the vertical section plane is specified in FIG. 4 and the section is taken across line 7-7. The embodiment's 100 inertial water tube 103 has an approximately cylindrical outer shell, casing, and/or structure. It also has an inner fluid channel and/or reaction tube comprised of three segments: a lower, approximately cylindrical portion 111; a medial, approximately frustoconical portion 112, and; an upper, approximately cylindrical portion 113. The reaction tube has an uppermost aperture 109 that is within a plane approximately normal to a longitudinal axis of the reaction tube. The reaction tube also has a lowermost aperture 105 that is principally, primarily, and/or largely, within a plane oriented between 65 and 85 degrees, e.g., 75 degrees, away from a plane normal to a longitudinal axis of the reaction tube, and/or approximately 15 degrees away from a plane parallel with, and/or containing, a longitudinal axis of the reaction tube. The reaction tube 111-113, and the outer inertial water tube 103, share a common lower cylindrical portion, wall, and/or tube 111. The common portion of the inner and outer tubes joins the inner reaction tube and the outer inertial water tube at junction and/or seam 114.

As the embodiment 100 illustrated in FIG. 7 moves up and down in response to wave motion, water 110, 106 moves into and out of the lower aperture 105 of the embodiment's inertial water tube 103 and reaction tube 111. In a similar and/or related fashion, an upper surface 115 of the water 116 within the reaction tube 111-113 moves 117 up and down.

As water within the upper portion 112-113 of the reaction tube moves up and down, its passage through, encounter with, and/or obstruction by the constricted frustoconical portion 112 of the reaction tube causes the water's movement to be accelerated. Occasionally water accelerated upward within the embodiment's reaction tube achieves sufficient upward momentum that a portion of that upwardly moving water is ejected 118 from the upper mouth 109 and/or aperture of the reaction tube 113 and thereafter falls onto an upper surface 119 of, merges with, and is thereby captured within, a reservoir 120 of water contained within a lower portion of the interior of the embodiment's hollow buoy 102. Water ejected from the upper mouth of the reaction tube is diverted laterally by an approximately conical diverter 121.

Above the upper surface 119 of the water reservoir 120 within the interior of the embodiment's hollow buoy 102 is a pocket of pressurized air 122 that imparts pressure to the water within the water reservoir as well. The pressure of the air within the air pocket 122 pushes the resting and/or nominal level 115 of the water within the embodiment's reaction tube 111-113 to a depth below the resting and/or nominal level 101 of the water on that the embodiment floats.

Pressurized water 120 within the embodiment's hollow buoy 102 flows out of the buoy, and into the body of water 101 on that the embodiment floats, through an effluent pipe. The water turbine 126 positioned within the effluent pipe 124 is caused to rotate by the outflow of pressurized water 125 from the water reservoir 120. A generator operably connected to the water turbine 126, and integrated within the effluent pipe/water turbine (e.g. a hubless water turbine) generates electrical power in response to rotations of the water turbine.

Because the water 110, 106 entering and leaving the lower aperture 105 of the inertial water tube 103, and/or reaction tube 111, does not enter and leave that tube parallel to a longitudinal axis of the reaction tube 111, a reactionary pressure-induced force is imparted to and/or against the extended portion 104 of the lowermost portion and/or part of the reaction tube 111 and inertial water tube 103. Because this pressure-induced force is imparted to and/or against the extended portion 104 of the lowermost portion and/or part of the inertial water tube, and is not balanced, counteracted, compensated, and/or offset by an equal and opposite pressure-induced force imparted to and/or against an opposing and/or complementary wall of the reaction tube and/or inertial water tube opposite the extended portion 104 of that inertial water tube, i.e. since that opposing and/or complementary wall of the inertial water tube is replaced by a upward-angled and non-horizontal aperture, mouth, and/or hole, in the side of the inertial water tube opposite the extended portion 104 of the tube, the resulting unbalanced force imparted to the forward-facing wall of the inertial water tube and/or reaction tube opposite the lower aperture creates a net force and/or thrust along the direction of arrow 123 that tends to propel the device 100 in a forward and/or leftward direction ("leftward" with respect to the orientation of the embodiment illustrated in FIG. 7), i.e. the same direction as that of the thrust arrow 123 responsible for that propulsion.

An embodiment similar to the one illustrated in FIGS. 1-7 comprises an approximately vertical and cylindrical reaction tube within which water flows up and down in response to wave motions at the embodiment. However, unlike the embodiment illustrated in FIGS. 1-7, the similar embodiment is an oscillating water column, and contains a pocket of air above the mean level of the water 101 outside the embodiment. In response to up and down movements of the water within the embodiment's reaction tube, the pocket of air above the water within the reaction tube tends to be compressed and decompressed, and tends to cause portions of that air to flow out of, and into, an air turbine fluidly connected to both the pocket of air within the reaction tube and the atmosphere outside the embodiment.

Figure 8:
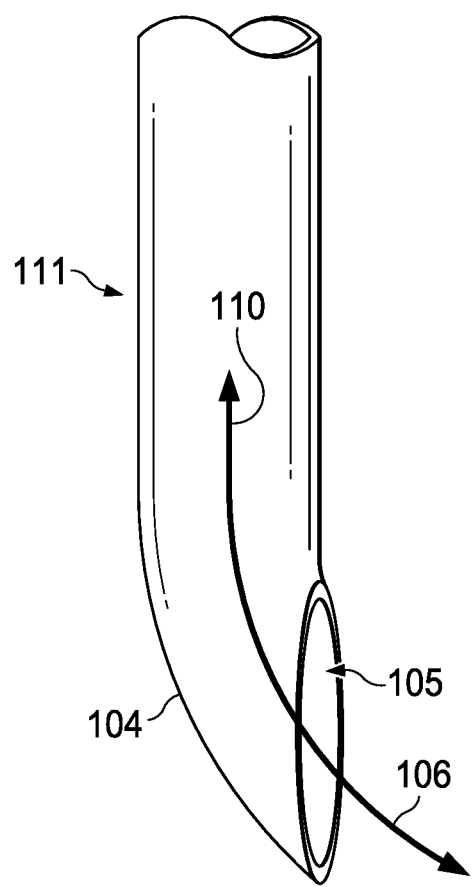
FIG. 8 is an enlarged, perspective view of an alternate thrust mechanism.

Embodiments similar to the one illustrated in FIGS. 1-7 contain lower apertures 105 characterized by bottom edges that do not follow the exact slant or the exact curvature shown in FIGS. 1-7. For example, embodiments of the present disclosure include embodiments having lower apertures that open 100% laterally, and wherein a sidewall of the tube curves inwardly near the bottom of the inertial water tube to provide a "scoop" or "eagle talon" shape directing downflowing water laterally to the 100% laterally-directed aperture. FIG. 8 shows a close-up perspective side view of an alternate configuration and/or design of the lowermost portion of the hollow inertial water tube of the same embodiment of the present disclosure that is illustrated in FIGS. 1-6, wherein the lowermost aperture 105 of that inertial water tube is primarily defined within a plane that is nominally parallel to a vertical longitudinal axis of the floating device. The rim or edge of the lower aperture 105 lies within a vertical plane, hence making the aperture 100% laterally directed. The present disclosure contains within its scope all embodiments whose bottom aperture directs outflowing water to have a mean flow vector having any lateral component. The present disclosure also contains with its scope embodiments whose bottom aperture has a rim and/or edge not lying within a plane, but instead lying within a curved surface.

We claim:

1. A self-propelled vessel comprising:
   an upper hull adapted to float at an upper surface of a body of water; and
   a hollow tube depending from the upper hull and defining an inner tube channel in fluid communication with an interior of the upper hull, said hollow tube defined by a wall between and an upper aperture and a lower aperture and wherein said wall does not extend directly below the lower aperture;
   wherein a first portion of the lower aperture extends to a lowermost end of the hollow tube and a second portion of the lower aperture extends above the lowermost end of the hollow tube to divert water non-vertically and radially asymmetrically out of the inner tube channel at the lower aperture when water flows out of the lower aperture.

2. The self-propelled vessel of claim 1, wherein the hollow tube includes a longitudinal centerline that passes through the lower aperture.

3. The self-propelled vessel of claim 1, wherein the hollow tube has a vertical projection that overlays and coincides with the lower aperture's vertical projection.

4. The self-propelled vessel of claim 1, further comprising an effluent aperture through which water deposited within the vessel via the hollow tube flows back into the body of water.

5. The self-propelled vessel of claim 4, further comprising a water turbine and an operably connected generator cooperating to extract energy from water flowing out of the vessel through the effluent aperture.

6. The self-propelled vessel of claim 1, wherein the upper hull is a bulbous enclosure adapted to enclose a water reservoir and a pocket of pressurized gas.

7. A self-propelled vessel comprising:
   an upper hull adapted to float at an upper surface of a body of water; and
   a hollow tube depending from the upper hull and having an interior tube channel in fluid communication with an interior of the upper hull through a proximal aperture of the hollow tube and in fluid communication with the body of water through a distal aperture of the hollow tube at a lowermost end of the hollow tube, the proximal aperture positioned within the upper hull and adapted to discharge water from the interior tube channel of the hollow tube into the interior of the upper hull;
   wherein a first edge of the distal aperture is positioned above a second and opposite edge of the distal aperture, and whereby water flowing out of the distal aperture is diverted non-vertically therethrough.

8. The self-propelled vessel of claim 7, wherein the hollow tube includes a bend.

9. The self-propelled vessel of claim 7, further comprising a constriction in the interior tube channel of the hollow tube wherein the cross-sectional area of the tube is greater at the lower aperture than at the upper aperture.

10. The self-propelled vessel of claim 9, further comprising an effluent aperture through which water deposited within the vessel via the hollow tube flows back into the body of water.

11. The self-propelled vessel of claim 10, further comprising a water turbine and operably connected generator adapted to extract energy from water flowing out of the vessel through the effluent aperture.

12. The self-propelled vessel of claim 7, wherein the upper hull is a bulbous enclosure adapted to enclose a water reservoir and a pocket of pressurized gas.

13. A self-propelled buoyant vessel comprising:
   a hollow sphere that floats adjacent to an upper surface of a body of water;
   a hollow tube depending from the hollow sphere, said hollow tube having an interior fluidly connected by at least one lower aperture to the body of water, and said hollow tube and said lower aperture each having vertical projections;
   wherein an area of the vertical projection of the lower aperture is smaller than an area of the lower aperture; and
   wherein the area of the vertical projection of the lower aperture is equal to an area of the vertical projection of the hollow tube.

14. The self-propelled buoyant vessel of claim 13, wherein the hollow tube does not have a void between the lower aperture and the hollow sphere.

15. A self-propelled vessel comprising:
   an upper hull adapted to float at an upper surface of a body of water; and
   a hollow tube depending from the upper hull and defining an inner tube channel in fluid communication with an interior of the upper hull;
   wherein an opening in a lower portion of the hollow tube defines a lower tube aperture fluidly connecting the inner tube channel with the body of water;

wherein a first lateral edge of the lower tube aperture is higher than an opposite lateral edge of said lower tube aperture to divert water non-vertically out of the inner tube channel when water flows out of said lower tube aperture;

wherein said lower tube aperture is the largest opening in the hollow tube; and wherein a lower portion of a wall forming the hollow tube is positioned to redirect at least a majority of water flowing downwardly in the hollow tube in a non-vertical direction out of said lower tube aperture.

16. A self-propelled vessel comprising:

an upper hull adapted to float at an upper surface of a body of water; and a hollow tube depending from the upper hull and defining an inner tube channel in fluid communication with an interior of the upper hull;

wherein said hollow tube includes a lower aperture in fluid communication with the inner tube channel and the body of water;

wherein the lower aperture is formed by an intersection of the hollow tube and a transverse, non-vertical plane; and wherein the lower aperture has an area greater than a cross-sectional area of the inner tube channel.

* * * * *